Feb. 24, 1953 L. P. RATTI 2,629,153
SPRING CLIP FOR FASTENING PAPERS
Filed Feb. 8, 1949 2 SHEETS—SHEET 1
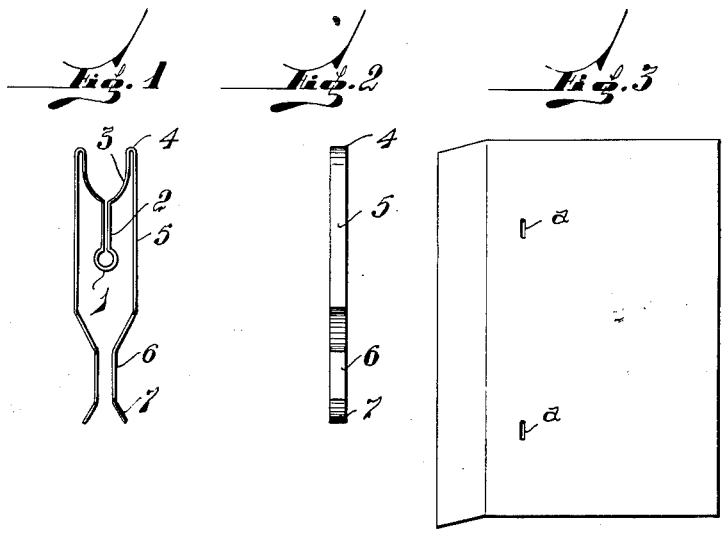
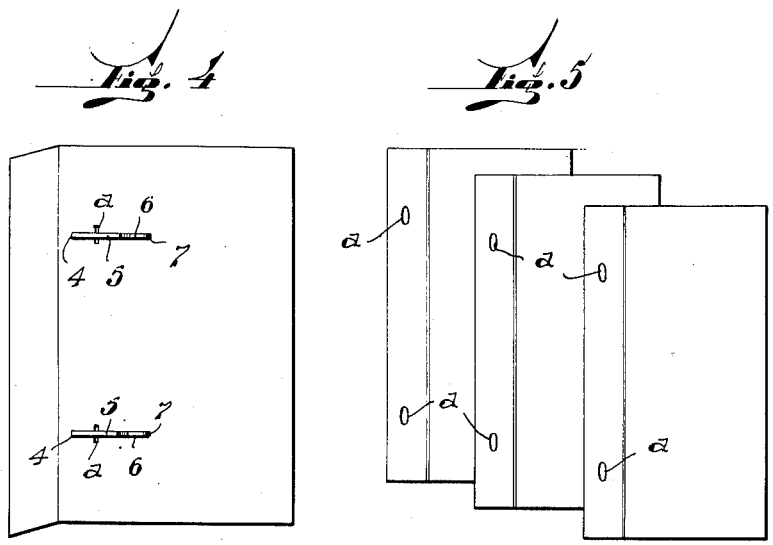
INVENTOR,
Luis Pedro Ratti
BY Joan P. Tashof,
ATTORNEY Feb. 24, 1953   L. P. RATTI   2,629,153
SPRING CLIP FOR FASTENING PAPERS
Filed Feb. 8, 1949   2 SHEETS—SHEET 2
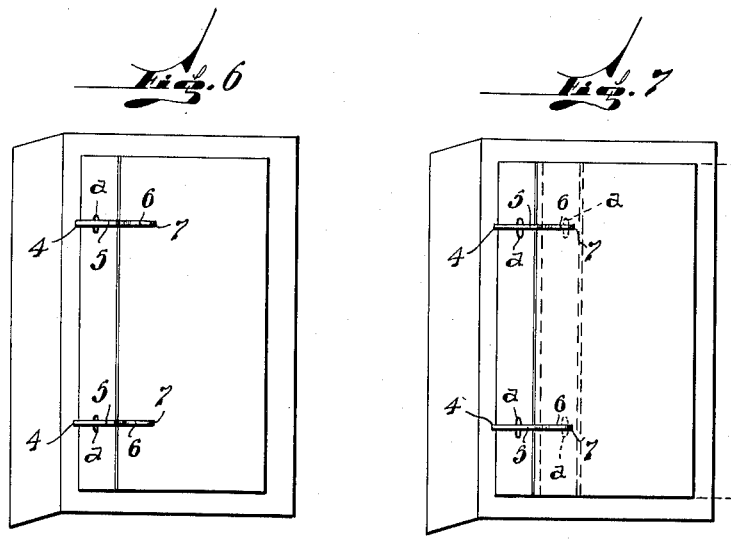
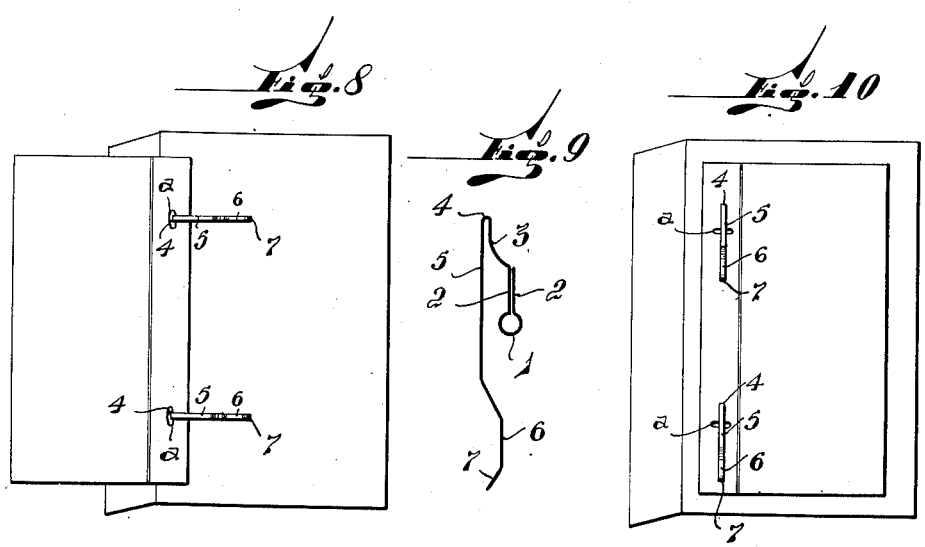
INVENTOR,
Luis Pedro Ratti
BY
ATTORNEY Patented Feb. 24, 1953

2,629,153

UNITED STATES PATENT OFFICE 2,629,153

SPRING CLIP FOR FASTENING PAPERS

Luis Pedro Ratti, Buenos Aires, Argentina

Application February 8, 1949, Serial No. 75,195
In Argentina March 13, 1948

5 Claims. (Cl. 24—66)

This invention relates to a device for fastening together, binding, filing and also hanging sheets of paper, leather, cloth or the like, such as letters, documents, parchments, cards, samples, etc, hereinafter called fastening device.

Up to the date of this invention the usual way of fastening several pages together is by using the very well known wire clips made of two U-shaped jaws parallel with each other and joined at one end. This clip as well as several modified embodiments thereof are only able to fasten together, by the pressure action of their two jaws a limited number of papers or the like.

These clips are unable to fasten together in a definitive manner a plurality of sheet-like units. By "definitive manner" is to be understood that the clip is able to fasten together these sheet-like units in such a manner that it is necessary to destroy a part of any unit after the top one if it is desired to remove said unit without removing the other preceding units.

The device of the present invention is so designed that it is able to perform the function of the known clips and furthermore it is able to fasten the sheet-like units in a definitive manner, as will be hereinafter more clearly explained.

The fastening device, according to the present invention is preferably used in combination with a backing on which one or more of said fastening devices are mounted, so as to provide a complete filing folder in which said sheet-like units may be filed in the different manners as pointed out above. Said fastening device made preferably of metal, is constituted by a clip made of strip or wire in a single piece, with several co-planar bends upon itself, forming various resilient angular portions, which are so shaped and located as to enable retaining actions to be obtained in combination with said backing, for the sheet-like units by pressure or hanging, or by a combination of both. The width of the material is chosen so that it will pass through the holes made in the sheet-like units, such as paper sheets etc., and the thickness should be sufficient for attaining a suitable strength. The size of the fastening device may be in relation with the base or backing on which it is to be mounted and also with the size of the sheet-like units to be fastened, and in the most usual models the length may vary from ¼ to ⅒ of the width of such sheet-like units.

From the foregoing it will be apparent that this invention refers to a fastening device made of a single resilient member bent upon itself and including two parallel straight portions substantially in close contact relationship throughout their whole length, each having an inner end and an outer end, the inner ends being adjacent to each other and connected by a pressure exerting member for maintaining said two straight portions in said close contact relationship, one of the outer two ends being a free end, a third straight portion parallel to said two straight portions and spaced therefrom, the remaining one of said ends being joined to one end of said third straight portion by means of an intermediate spacing portion, said third straight portion terminating at its other end in an offset free end portion substantially in alignment with the straight portion having said remaining end.

One of the objects of the present invention is to provide a fastening device, which can hold sheet-like units with different degrees of effectiveness i. e. in a temporary or permanent manner, as desired. This affords the advantage of being able to bind the papers or documents in a more or less durable manner, depending on whether such papers are to be held under momentary observation or disposition, or definitely kept or filed.

Another object is to provide a one piece fastening device which is strong and simple, easy to make, with the consequent economy of material and elimination of the operations of removal and assembling of parts when placing or removing paper sheets, etc., to be filed.

Still another object is to provide a fastening device which, when made double and symmetrical in a single plane can give simultaneous and identical service on both faces of the same base or backing.

This feature of the twin model has the advantage of allowing the separation into two parts of the contents of a single binder of papers or documents which for any reason should not be interleaved.

In the drawings, wherein like numerals of reference designate corresponding parts through the several views:

Figure 1 is a side elevation of a twin fastening device.

Figure 2 is a front elevation of the device shown in Figure 1.

Figure 3 is a backing shown in plan to be used in combination with the fastening device shown in Figures 1 and 2.

Figure 4 shows again in plan the backing of Figure 3 and said backing being provided with two fastening devices as shown in Figures 1 and 2.

Figure 5 shows in plan three sheet-like units to be fastened in the arrangement shown in Figure 4.

Figures 6, 7 and 8 show different applications of the fastening device.

Figure 9 is a simplified embodiment of the fastening device of this invention, which may be applied in a similar manner as the device of Figures 1 and 2, to the backing shown in Fig. 3.

Figure 10 shows a different arrangement of two fastening devices with regard to their backing.

While the device of this invention can operate alone and without any base or backing, acting as a hook or paper clip, it is intended to have a more useful and complete function, by mounting preferably a pair of such devices on a margin of a base or backing which may be a sheet of bristol board binder or a simple sheet of metal or plastic, which will act as a backing for the papers or the like.

In Figures 3, 4, 6, 7 8 and 10 each backing is formed of a sheet 8, the size of which should conveniently be slightly larger than the size of the sheet-like units to be filed. Said backing 8 has furthermore a cover 9 the purpose of which will be later explained.

As may be appreciated in Figure 9, wherein one embodiment of the fastening device is shown, said fastening device is made of a single piece and comprises two parallel straight portions 2, 2' substantially in close contact relationship throughout their whole length, which straight portions 2 and 2' have inner ends 19, 19' joined to each other by means of a pressure exerting member 1. This pressure exerting member 1 is a circular spring. The straight portion 2' has an outer free end 10, whilst straight portion 2 is joined through a curved portion 3 (having a concave and a convex face) forming with said straight portion 2 an angle 11 to a third parallel straight portion 5 spaced from said first two straight portions 2 and 2' by means of a throat 4. Said third straight portion 5 has, at the opposite end to the linkage with throat 4 an offset portion 12 directed towards the center line 13 of the fastening device. Said offset portion 12 merges into a fourth straight portion forming a pressure member 6 which is substantially in alignment with the center line 13. Pressure member 6 ends in a free ear 7.

The embodiment specifically shown in Figures 1 and 2 comprises substantially the same parts as the embodiment shown in Figure 9, but the center line 13 is the axis of symmetry for a symmetrical arrangement comprising a curved portion 3', a throat 4', another third straight portion 5', an offset portion 12', a pressure member 6' and an ear 7'.

The mounting of the device on a rigid sheet of bristol board, metal, plastic or the like, is carried out by first making suitable cuts a, a for instance on the left margin of the base (Fig. 3) midway of the length thereof. The separation of said cuts or openings a, a on each of which a fastening device is to be mounted is adopted in accordance with the separation of the perforations already made in the papers to be fastened by said fastening device. Ear 7 shown in Figs. 1, 2 and 9, is inserted in said cuts a, a, from one side to the other by passing successively through said cuts a, a, the pressure members 6, the straight portion 5 and throat 4, whereupon the direction of the pushing action is reversed so as to pass the curved portion 3 and finally press between both straight portions 2 and 2' a corresponding part of the margin of the backing where it will be firmly held through the action of spring 1, thus assuming its final position as shown in Fig. 4.

It should be noted that if it is desired to use the device in a twin or symmetric arrangement, as shown in Figs. 1 and 2, each half will remain fixed to one face of the backing 8, whereby both halves of the device will constitute identical, complete and independent fasteners. When mounted on its base or backing 8 this double structure of the device will constitute a novel two-front file.

It will now be apparent that the fastening device is outwardly projecting from the backing 8. In order to avoid that various of these arrangements 7 backing and fastening devices be in the way of each other when filed, the backing 8 of each arrangement is conveniently provided with a cover 9 as shown in Figures 3, 4, 6, 7 and 9, when the simplified device (Fig. 9) is used. This cover 9 will thus provide a closeable file.

In case the twin embodiment (Figs. 1 and 2) is used, a backing with two opposite covers (not shown) could be used, so that said backing constitutes the separation of two combined folders.

With the binder 17 thus assembled, as shown in Fig. 4 the sheets 14, 15 and 16, for instance can as shown in Fig. 5, be fastened in the binder of Fig. 4. Each of said sheets 14 to 16 is provided with the usual perforated margin 14', 15' and 16', respectively and each margin has two perforations a' spaced from each other a distance corresponding to the spacing of perforation a. As already stated it is possible to fasten the sheets in different ways; thus, for fastening the sheets in the "definitive manner" it is necessary to hold the reverse of the margin of one sheet and pass the ear 7 of each fastening device through the openings a', a', whereupon said ears will appear at the front of the sheet; continuing the action in the same direction, the sheet is further displaced so as to pass the perforations a', a' thereof successively through pressure members 6, straight portions 5, throats 4 and reach the curved portions 3, by inverting the direction of displacement of the sheet whereupon the margin of the sheet will remain on the concave face of the curved portion 3. By inserting, in the manner described, successively one sheet after the other, they will accumulate one over the other on the concave surface of the curved portion 3, and these sheets will be retained by a double retaining action, viz; one due to the housing of said margins in the curved portion 3, and the other through the pressure exerted by pressure member 6 on said sheets, said combination of effects producing a very efficient combined action and resulting in a binding system having the advantages mentioned hereinbefore, without any damage to the papers near the perforations thereof. Figs. 6 to 8 show different stages of the fastening process, as well as different applications of the arrangements.

In order to remove the sheets, the above operations are carried out in the reverse order.

The fastening device, when mounted on a base 8 as described, can also hold papers without perforations.

For this kind of fastening it is sufficient to insert the margin of the paper between the backing 8 and the pressure member 6 of said fastening device, and since pressure member 6 exerts a pressure on backing 8, the paper is thus fastened and may be easily withdrawn.

It is obvious that by using the twin fastening devices (Figs. 1 and 2) mounted on a base as described, both faces of the backing may be used in the same manner and at the same time.

In Fig. 10 a slight modified arrangement is shown.

The fastening devices are mounted on the same imaginary vertical line 18 of the backing 8, so as to take the minimum marginal space of the papers to be fastened.

As regards the shape of the device, it is capable of assuming as many as it is desired, always within the combination of angles, curved portions and springs described hereinbefore and within the scope of the invention as set forth in the appended claims.

I claim:

1. A fastening device made of a single resilient member bent upon itself comprising two parallel straight portions, substantially in close contact relationship throughout their whole length, each having an inner end and an outer end, the inner ends being adjacent to each other and connected by a pressure exerting member for maintaining said two straight portions in said close contact relationship, a third straight portion parallel to said two straight portions and spaced therefrom, one of said ends being joined to one end of said third straight portion by means of an intermediate spacing portion, said third straight portion terminating at its other end in an offset free end portion substantially in alignment with the straight portion to which said third straight portion is connected.

2. A fastening device made of a single resilient member bent upon itself and including two parallel straight portions substantially in close contact relationship throughout their whole length, each having an inner end and an outer end, the inner ends being adjacent to each other and connected by a pressure exerting member for maintaining said two straight portions in said close contact relationship, one of the outer two ends being a free end, a third straight portion parallel to said two straight portions and spaced therefrom, the remaining one of said ends being joined to one end of said third straight portion by means of an intermediate spacing portion, said third straight portion being longer than said other two parallel straight portions and said intermediate spacing portion being a curved portion having a concave and a convex face, the convex face being directed towards said third straight portion, said third straight portion terminating at its other end in an offset free end portion substantially in alignment with the straight portion having said remaining end.

3. A fastening device made of a single resilient member bent upon itself and including two parallel straight portions substantially in close contact relationship throughout their whole length, each having an inner end and an outer end, the inner ends being adjacent to each other and connected by a pressure exerting member for maintaining said two straight portions in close contact relationship, a third straight portion located at one side of one of said two straight portions in parallel spaced relationship thereto, a fourth straight portion located at one side of the other of said two straight portions in parallel spaced relationship thereto, said outer ends being connected to the respective one of said third and fourth straight portions by means of a curved portion each, each of said third and fourth straight portions terminating at its other end in an offset free end portion substantially in alignment with the respective one of said first two straight portions.

4. A fastening device made of a single resilient member bent upon itself and including two parallel straight portions substantially in close contact relationship throughout their whole length, each having an inner end and an outer end, the inner ends being adjacent to each other and connected by a pressure exerting member for maintaining said two straight portions in close contact relationship, a third straight portion located at one side of one of said two straight portions in parallel spaced relationship thereto, a fourth straight portion located at one side of the other of said two straight portions in parallel spaced relationship thereto, said outer ends being connected to the respective one of said third and fourth straight portions by means of a curved portion each, each of said curved portions having a concave and a convex face, the convex face being directed towards said third and fourth straight portions respectively, each of said third and fourth straight portion terminating at its other end in an offset free end portion substantially in alignment with the respective one of said first two straight portions.

5. A fastening device made of a single resilient member bent upon itself and including two parallel straight portions substantially in close contact relationship throughout their whole length, each having an inner end and an outer end, the inner ends being adjacent to each other and connected by a pressure exerting member for maintaining said two straight portions in close contact relationship, a third straight portion located at one side of one of said two straight portions in parallel spaced relationship thereto, a fourth straight portion located at one side of the other of said two straight portions in parallel spaced relationship thereto, said outer ends being connected to the respective one of said third and fourth straight portions by means of a curved portion each, each of said third and fourth straight portions terminating at its other end in an offset free end portion substantially in alignment with the respective one of said first two straight portions, said offset free end portion of said third and fourth straight portions being in contact throughout substantially their whole length.

LUIS PEDRO RATTI.

REFERENCES CITED

The following references are of record in the file of this patent:

UNITED STATES PATENTS

| Number | Name | Date |
| --- | --- | --- |
| 436,242 | Jordan | Sept. 9, 1890 |
| 764,379 | Ries | July 5, 1904 |
| 883,317 | Kindwall | Mar. 31, 1908 |
| 983,106 | Zimmer | Jan. 31, 1911 |
| 1,516,498 | Pilkington | Nov. 25, 1924 |
| 1,587,335 | Kline | June 1, 1926 |
| 2,269,649 | Comley | Jan. 13, 1942 |
| 2,324,929 | Jennings | July 20, 1943 |
| 2,452,514 | Zychlinski | Oct. 26, 1948 |